Patented June 4, 1940

2,202,825

UNITED STATES PATENT OFFICE 2,202,825

PREVENTION OF MOTOR-BEARING CORROSION

Oliver L. Brandes, Pittsburgh, Pa., assignor to Gulf Research & Development Company, Pittsburgh, Pa., a corporation of Delaware No Drawing. Application August 16, 1938, Serial No. 225,202

4 Claims. (Cl. 87—9)

This invention relates to the prevention of motor-bearing corrosion; and it comprises a method of inhibiting the corrosion or deterioration of bearing alloy surfaces during use, by lubricating said bearing with an oil containing a small but effective amount of 2,6-di-tertiary-butyl-4-methyl phenol as a corrosion inhibiting agent; and it further comprises an improved motor bearing lubricant consisting of a highly refined paraffinic oil and 0.1 to 1.0 per cent of 2,6-di-tertiary-butyl-4-methyl phenol; all as more fully hereinafter set forth and as claimed.

Modern engines, particularly gasoline engines such as those intended for use in the automotive and aviation fields are designed to meet an ever-increasing demand for compactness with increased speed, power and acceleration. The factors of increased speed, power and acceleration involve increases in bearing loads which cannot be adequately compensated for by increasing the size of the bearings due to the requirement for compactness in engines of this type. Considerable trouble has therefore been experienced with the bearings in such engines.

In order to overcome these difficulties various improvements have been made in bearing designs with a view to reducing bearing temperatures, and improved bearing alloys capable of operating under more severe conditions have come into use.

Bearings formed of these alloys have proved satisfactory mechanically but it has been found that these improved bearing alloys are normally subject to corrosion. This corrosion can become quite severe particularly in certain applications involving long heavy duty and high temperatures of operation. Under such conditions of operation the lubricating oils tend to deteriorate more or less rapidly. Even the highly refined paraffinic oils which are considered to be the best available motor lubricants will deteriorate in use when the bearing loads and operating temperatures are higher than normal. The corrosion of these modern bearing alloys has been found to be particularly marked when the lubricating oil has deteriorated substantially.

It is desirable therefore that a method be provided for the lubrication of automotive and aviation motors containing bearings formed of alloys normally subject to corrosion such as the known cadmium-silver, cadmium-nickel and copper-lead bearing alloys, by which the corrosion of such bearings in use may be inhibited, and that a suitable lubricating oil composition be provided which may be used in such motors when they are subject to extraordinarily heavy duty and high temperature operating conditions, without excessive corrosion of the bearing alloy or deterioration of the lubricant.

I have found that the corrosion of bearing alloy surfaces normally subject to corrosion can be inhibited or substantially retarded by incorporating in the oil used to lubricate the bearing a small amount of 2,6-di-tertiary-butyl-4-methyl phenol. By lubricating cadmium-silver, cadmium-nickel, copper-lead and like alloy bearings normally subject to corrosion with an oil such as a highly refined paraffinic oil containing at least 0.1 per cent of 2,6-di-tertiary-butyl-4-methyl phenol, I have been able to prevent corrosion of the bearing surface in use to a large extent, without sacrificing the desirable properties of the oil itself. I have thus been able to produce an improved motor lubricant which may be used for long periods under extraordinary service conditions, in motors having bearings normally subject to relatively rapid corrosion, without substantial corrosion of the bearing surfaces.

It has heretofore been proposed to incorporate various compounds in lubricating oils for the purpose of preventing bearing corrosion. These addition agents have proved quite effective in some instances but in many cases are too expensive for general use. Various of these agents are also subject to the disadvantage that they tend to increase the normal rate of sludge formation in the oil and they do not have good oil-solubilities so that it is difficult or impossible to maintain effective amounts of the agents in solution in the lubricant under marketing and service conditions. Also some addition agents heretofore proposed tend to modify some of the desirable physical properties of the lubricating oils. This is particularly true of those agents which are effective only when used in relatively large amounts. The highly refined lubricating oils are carefully prepared to meet exacting specifications as to their physical properties. The addition to such an oil of a relatively large amount of a corrosion inhibiting agent, particularly an agent having physical properties substantially different from those of the oil will modify the properties of the oil so that it may be unsatisfactory for the use for which it is intended.

I have found that 2,6-di-tertiary-butyl-4-methyl phenol is a very effective bearing corrosion inhibitor and that the addition of this compound to a lubricating oil in effective amounts may be made without substantially modifying the desirable physical properties of the oil. Thus for example I have found that by the addition of 2,6-di-tertiary-butyl-4-methyl phenol in concentrations of 0.1 to 1.0 per cent to a highly refined paraffinic lubricating oil I can produce a lubricant having all of the desirable properties of the highly refined paraffinic oils and in addition having the property of inhibiting bearing corrosion, even when such lubricants are used under extraordinarily severe service conditions in contact with a bearing alloy normally subject to corrosion. Furthermore, 2,6-di-tertiary-butyl-4-methyl phenol does not accelerate sludge formation and it is quite soluble in oil and may be maintained in solution in the oil under marketing and service conditions without difficulty.

The results obtainable by incorporating 2,6-di-tertiary-butyl-4-methyl phenol in different types of oil used to lubricate bearings formed of various alloys normally subject to corrosion is illustrated in the following examples.

In these tests highly refined paraffinic oils of automotive and aviation grade to which varying quantities of 2,6-di-tertiary-butyl-4-methyl phenol had been added were used to lubricate the bearings in a single cylinder test engine. This test engine is an automobile prototype engine built of standard-sized automobile engine parts arranged so that bearing shells can be replaced easily. In making the test this engine is operated with a crankcase temperature of 280° F. and an air stream amounting to six liters per hour is contacted with the oil by a supplementary pump. After operating for ten hours under these accelerated conditions the engine is cooled and dismantled and the bearings are inspected for corrosion by appearance and loss of weight. The bearings are then put back and the engine is operated for another ten hours. This cycle is repeated until the bearings show definite evidence of corrosion.

Tests were made using two different types of alloy bearings normally susceptible to corrosion, one of which was an alloy of the class of cadmium-silver alloys containing 98.35 per cent cadmium, 0.76 per cent silver, 0.26 per cent nickel, 0.04 per cent lead and 0.59 per cent copper, while the other was an alloy of the class of copper-lead alloys containing 50 per cent of each component. A highly refined paraffinic automobile oil (S. A. E. 20) and a similar aviation oil (S. A. E. 50) were tested with and without additions of 2,6-di-tertiary-butyl-4-methyl phenol as lubricants for each type of bearing alloy. The results obtained were as follows:

A bearing formed of the copper-lead alloy lubricated with the S. A. E. 20 oil to which nothing had been added showed a loss of 60.3 mg. per square inch after twenty hours of operation while a similar bearing lubricated with the S. A. E. 20 oil to which 0.4 per cent of 2,6-di-tertiary-butyl-4-methyl phenol had been added showed a loss of only 9.0 mg. per square inch in the same period and a loss of only 22.9 mg. per square inch after thirty hours of operation.

A bearing formed of the cadmium-silver alloy lubricated with the S. A. E. 20 oil to which nothing had been added failed after fourteen hours of operation with a loss of 284 mg. per square inch. A similar bearing lubricated with the S. A. E. 20 oil to which 0.1 per cent of 2,6-di-tertiary-butyl-4-methyl phenol had been added showed a loss of 80 mg. per square inch after twenty hours operation while one lubricated with the S. A. E. 20 oil to which 0.2 per cent of 2,6-di-tertiary-butyl-4-methyl phenol had been added showed a loss of only 7.4 mg. per square inch in the same period and one lubricated with the S. A. E. 20 oil to which 0.4 per cent of 2,6-di-tertiary-butyl-4-methyl phenol had been added showed a loss of only 4.5 mg. per square inch after 20 hours operation.

A bearing formed of the copper-lead alloy lubricated with the S. A. E. 50 oil to which nothing had been added showed a loss of 162.1 mg. per square inch after thirty hours of test operation and a similar bearing lubricated with S. A. E. 50 oil to which 0.4 per cent of 2,6-di-tertiary-butyl-4-methyl phenol had been added showed a loss of only 14.0 mg. per square inch in the same period.

A bearing formed of the cadmium-silver alloy lubricated with S. A. E. 50 oil to which nothing had been added failed after twenty hours test operation showing a loss of 213.5 mg. per square inch and a similar bearing lubricated with S. A. E. 50 oil to which 0.4 per cent of 2,6-di-tertiary-butyl-4-methyl phenol had been added showed a loss of only 3.5 mg. per square inch in the same period and a loss of only 9.2 mg. per square inch in thirty hours of test operation.

From these results it is clear that when a bearing formed of a bearing alloy normally subject to corrosion during use, is lubricated with an oil particularly a highly refined paraffinic oil to which 2,6-di-tertiary-butyl-4-methyl phenol had been added in amounts between 0.1 and 1.0 per cent according to the method of my invention, corrosion of the bearing is inhibited and markedly retarded. A lubricant consisting of a highly refined paraffinic oil containing 0.1 to 1.0 per cent of 2,6-di-tertiary-butyl-4-methyl phenol can consequently be used for longer periods of time, in automotive and aviation engines having bearings formed of alloys normally subject to corrosion, with less bearing deterioration than when the best lubricants heretofore known in the art are used.

By the term highly refined paraffinic oils as used herein and in the appended claims it is generally intended to indicate the less soluble portions of solvent extracted lubricating oils derived from Pennsylvania crudes or oils which have been refined or blended to have a paraffinicity at least equal to that of an oil derived from a Pennsylvania crude and having physical properties conforming in general to the properties of oils derived from Pennsylvania crudes. These solvent extracted oils have their content of sulfur compounds reduced to a very low point which may account for the fact that the highly refined oils exhibit a particular tendency to corrode bearings formed of alloys normally subject to corrosion. Whether or not such is the case I have found that the addition of 2,6-di-tertiary-butyl-4-methyl phenol to a highly refined paraffinic oil produces a composition of exceptional effectiveness in preventing bearing corrosion.

While my invention has been described herein with particular reference to various preferred forms and various specific examples, it is to be understood that my invention is not limited to the details of such preferred forms and specific examples except as hereinafter defined in the appended claims.

What I claim is:

1. A method of inhibiting the corrosion of bearings formed of alloys normally subject to corrosion during use comprising lubricating said bearings with an oil containing at least 0.1 per cent of 2,6-di-tertiary-butyl-4-methyl phenol.

2. A method of inhibiting the corrosion of bearings formed of alloys normally subject to corrosion during use comprising lubricating said bearings with a highly refined paraffinic oil containing at least 0.1 per cent of 2,6-di-tertiary-butyl-4-methyl phenol.

3. A method of inhibiting the corrosion of bearings formed of alloys normally subject to corrosion during use comprising lubricating said bearings with a highly refined paraffinic oil containing 0.1 to 1.0 per cent of 2,6-di-tertiary-butyl-4-methyl phenol.

4. An improved motor bearing lubricant adapted to prevent corrosion of bearings formed of an alloy normally subject to corrosion comprising a highly refined paraffinic oil containing 0.1 to 1.0 per cent of 2,6-di-tertiary-butyl-4-methyl phenol.

OLIVER L. BRANDES.